United States Patent [19]
Tsukamoto et al.

[11] Patent Number: 6,161,950
[45] Date of Patent: Dec. 19, 2000

[54] VEHICLE HEADLAMP HAVING A LEVELING UNIT

[75] Inventors: Michio Tsukamoto; Hirohiko Ohshio, both of Shizuoka, Japan

[73] Assignee: Koito Manufacturing Co., Ltd., Tokyo, Japan

[21] Appl. No.: 09/382,605

[22] Filed: Aug. 25, 1999

[30] Foreign Application Priority Data

Sep. 17, 1998 [JP] Japan ................................. 10-262971

[51] Int. Cl.$^7$ .................................................. F21V 17/02
[52] U.S. Cl. ........................ 362/513; 362/284; 362/324; 362/428
[58] Field of Search ................................. 364/269, 272, 364/277, 282, 285, 386, 418, 512, 513, 514, 526, 509, 523, 532, 427

[56] References Cited

U.S. PATENT DOCUMENTS

| | | | |
|---|---|---|---|
| 4,674,013 | 6/1987 | Manzoni | 362/467 |
| 5,769,525 | 6/1998 | Daumueller | 362/255 |
| 5,911,502 | 6/1999 | Zillgitt | 362/508 |
| 6,039,466 | 3/2000 | Duchenne | 362/515 |

OTHER PUBLICATIONS

WPI Abstract Accession No. 1997–264723 & JP 090092005 A (Koito) *Abstract.

*Primary Examiner*—Sandra O'Shea
*Assistant Examiner*—H. S. Sawhney
*Attorney, Agent, or Firm*—Sughrue, Mion, Zinn, Macpeak & Seas, PLLC

[57] ABSTRACT

A vehicle headlamp is provided with a leveling unit and a mechanical drive type beam switching device having one actuator mechanism. A low beam is switched to a high beam by driving the actuator of the leveling unit so as to tilt a reflector upward by an angle greater than a maximum upwardly-tilted angle at the time of leveling adjustment in order that the actuator may be set for common use. Moreover, a bulb holder is vertically tiltably supported by the reflector and tilted together with the reflector up to the aforementioned maximum upwardly-tilted angle on one hand, and the bulb holder is fixed to the maximum upwardly-tilted angle separately from the reflector by a stopper pin while the reflector may coincide with a high-beam upwardly tilting angle.

19 Claims, 10 Drawing Sheets

LOW BEAM

FIG. 5B

HIGH BEAM

VEHICLE HEADLAMP HAVING A LEVELING UNIT

BACKGROUND OF THE INVENTION

1. Field of the Invention

This invention relates to a vehicle headlamp comprising a leveling unit and a mechanical drive type beam switching device.

2. Description of the Related Art

Vehicle headlamps are designed to emit low or high beams via reflectors which reflect light from light source bulbs to a forward point. With respect to light sources (discharge light-emitting portions or filaments), though different light sources are generally used for low and high beams, respectively, because the direction of emitting the low beam differs from that of emitting the high beam, a vehicle headlamp using a single light source is also well known. Particularly in a two-lamp type vehicle headlamp using a discharge bulb as a light source bulb, a single light source arrangement is common.

In the case of a vehicle headlamp using such a single light source, a beam switching device switches a low beam to a high beam, and vice versa, by mechanically displacing optical elements such as the light source bulb, the reflector and the like.

In addition, a leveling unit is often provided in the vehicle headlamp for preventing a glare from bothering drivers of other vehicles. The leveling unit is arranged so that a low beam may be emitted in an optimum direction by vertically varying the direction in which the low beam is emitted, in accordance with a change in the posture of a vehicle body under control. In particular, the necessity of a leveling unit is greater when the vehicle headlamp is equipped with the discharge bulb that has a greater power than that of a halogen bulb or the like.

When the leveling unit is provided for the vehicle headlamp fitted with the beam switching device mentioned above, an actuator is necessary for each of the beam switching devices and leveling units.

Figure 10:
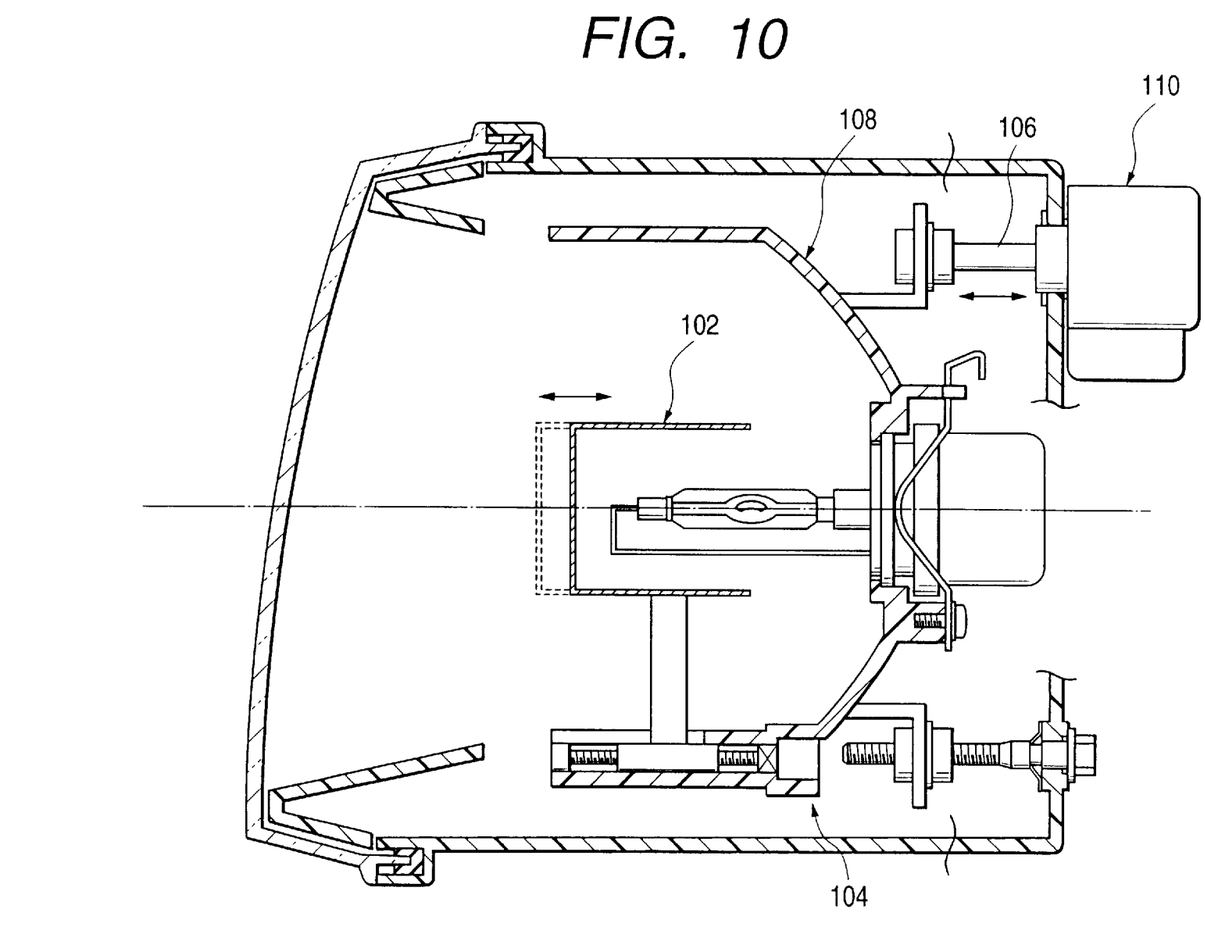
FIG. 10 is sectional side view of a conventional example.

In a vehicle headlamp of FIG. 10, for example, a beam-switching actuator 104 is required for longitudinally displacing a shade 102, and a leveling actuator 110 is required for vertically tilting a reflector 108 coupled to the leading end portion of an output rod 106 that has been displaced longitudinally. When two actuators are provided like this, a problem exists in that the lamp construction tends to be complicated, the weight is increased and the lamp becomes expensive.

SUMMARY OF THE INVENTION

In view of the aforementioned situation, an object of the present invention is to provide a vehicle headlamp having a leveling unit and a mechanical drive type beam switching device, in which the vehicle headlamp leveling and beam switching can be performed with a simple, lightweight, inexpensive construction.

The above object is accomplished by utilizing the actuator of the leveling unit for carrying out the beam switching.

A vehicle headlamp according to the present invention includes a light source bulb, a reflector for emitting a beam with a predetermined light distribution pattern by reflecting light from the light source bulb forward, a leveling unit for varying the direction of emitting the beam in accordance with a change in the posture of a vehicle body by vertically tilting the reflector, and a beam switching device for selectively switching the beam from a low beam to a high beam, and vice versa. The light source bulb is fixedly supported by a bulb holder which is vertically tiltably supported by the reflector. The beam switching device operates to switch the low beam to the high beam by driving the actuator of the leveling unit so as to tilt the reflector upward by a predetermined angle. The beam switching device also causes the bulb holder, together with the reflector, to tilt until the upwardly tilted angle of the reflector coincides with a second predetermined angle that is smaller than the predetermined angle at the time of beam switching, and maintains the bulb holder at an upwardly tilting angle that is smaller than the upwardly tilted angle of the reflector after the upwardly tilting angle of the reflector exceeds the second predetermined angle.

The aforementioned light source bulb is not limited to a light source bulb of a specific kind but may be a discharge bulb, an incandescent bulb (including a halogen lamp) or the like.

The aforementioned leveling unit may be an auto leveling unit for automatically and vertically varying the direction of emitting the low beam in accordance with a change in the posture of the vehicle body under control, or a manually-operated leveling unit for manually and vertically varying the direction of emitting the low beam in accordance with a change in the posture of the vehicle body.

The value of the aforementioned predetermined angle is not specifically limited as long as the value thereof allows each of the low and high beam functions to be exhibited by the vertical tilting equal to the predetermined angle.

As shown in the aforementioned arrangement, though the vehicle headlamp according to the present invention is fitted with the leveling unit and the mechanical drive type beam switching device, the light source bulb is fixedly supported by the bulb holder which is vertically tiltably supported by the reflector. The beam switching device operates to switch the low beam to the high beam by driving the actuator of the leveling unit so as to tilt the reflector upward by the predetermined angle and the beam switching device also causes the bulb holder, together with the reflector, to tilt until the upwardly tilted angle of the reflector coincides with a second predetermined angle that is smaller than the predetermined angle at the time of beam switching and maintains the bulb holder at an upwardly tilting angle that is smaller than the upwardly tilted angle of the reflector after the upwardly tilting angle of the reflector exceeds the second predetermined angle.

Consequently, the beam switching device operates to switch the low beam to the high beam by driving the actuator of the leveling unit so as to tilt the reflector upward by a predetermined angle. Also, the beam switching device causes the bulb holder together with the reflector to tilt until the upwardly tilted angle of the reflector coincides with a second predetermined angle that is smaller than the predetermined angle at the time of beam switching, and maintains the bulb holder at an upwardly tilting angle that is smaller than the upwardly tilted angle of the reflector after the upwardly tilting angle of the reflector exceeds the second predetermined angle. Consequently, the following function and effect are achievable.

Proper leveling control can be performed in the tilted angle area of the second predetermined angle, or smaller, where the bulb holder and the reflector are tilted integrally since the low-beam light distribution pattern is maintained. On the other hand, the position of the light source relative to the reflector varies in the upwardly tilted angle area of over the second predetermined angle since the bulb holder is maintained at the upwardly tilting angle smaller than that of the reflector, whereby the light distribution pattern is also varied. The light source is relatively displaced on the slightly lower side relative to the optical axis of the reflector then and the light distribution pattern is varied into a light distribution pattern having a larger portion of upward emission light in comparison with what has been established, by simply directing the low-beam light distribution pattern upward. Therefore, it is possible to secure remote visibility satisfactorily during the high-beam driving by using the light distribution pattern at the time the reflector is directed upward by the predetermined angle as the high-beam light distribution pattern.

The leveling actuator can be used simultaneously as a beam switching actuator by tilting the reflector separately from the bulb holder midway when the reflector is thus tilted upward.

In the vehicle headlamp fitted with the leveling unit and the mechanical drive type beam switching device according to the present invention, the leveling and beam switching can be performed with a simple, lightweight, inexpensive construction.

With the above arrangement, the bulb holder may be tilted at a tilting angle smaller than that of the reflector after the upwardly tilted angle of the reflector exceeds the second predetermined angle, or the upwardly tilted angle of the bulb holder may be fixed to the second predetermined angle. When the latter arrangement is adopted, the lamp can be further simplified in construction.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE INVENTION

Embodiments of the present invention will now be described with reference to the drawings.

Figure 1:
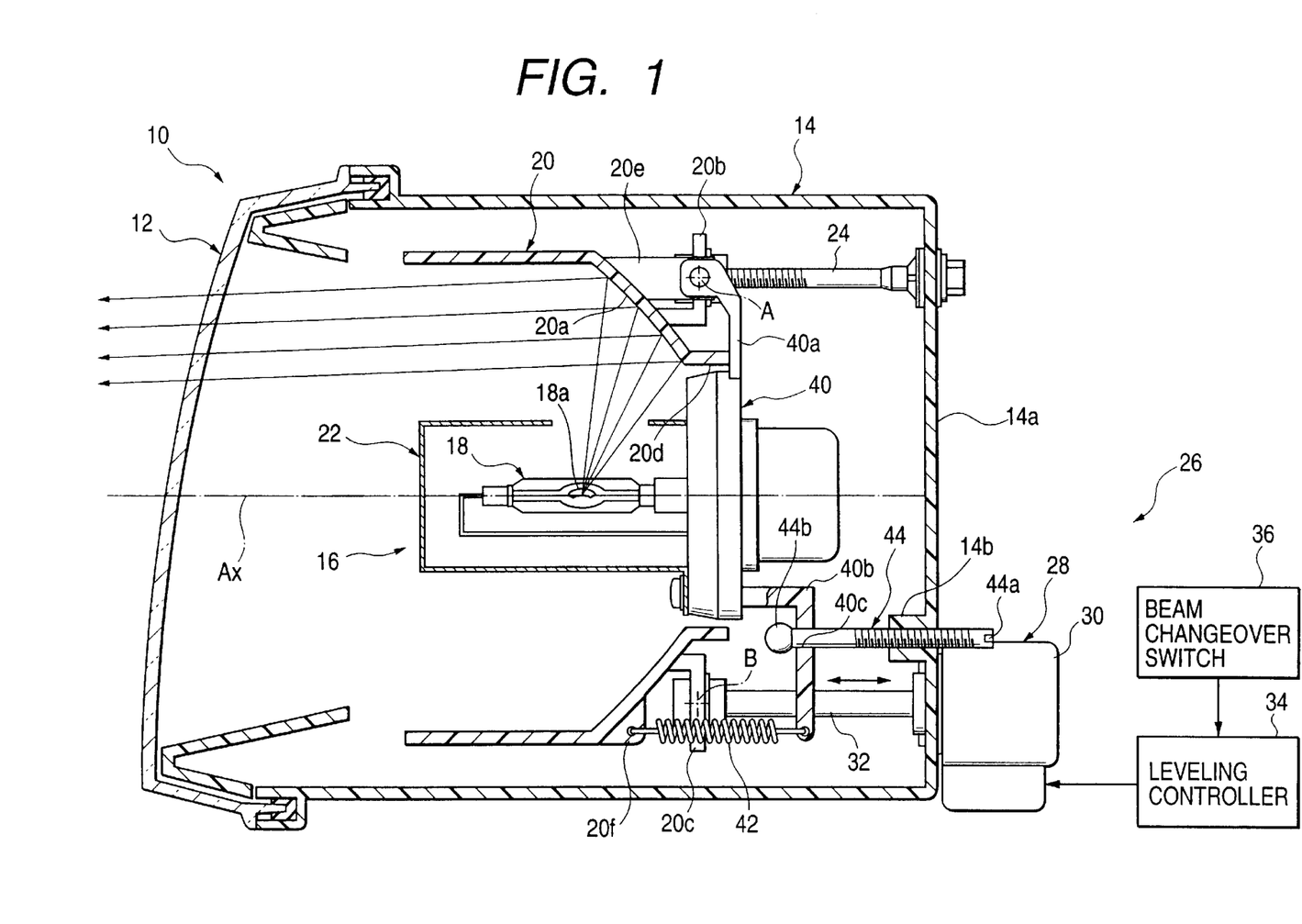
FIG. 1 is a sectional side view of a first embodiment of a vehicle headlamp of the present invention.

FIG. 1 is a sectional side view of a vehicle headlamp embodying the first embodiment of the present invention. As shown in FIG. 1, a vehicle headlamp 10 according to the present invention is fitted with a reflector unit 16 in a lamp chamber formed by a lens 12 and a lamp body 14 so that the reflector unit 16 is tiltable in the vertical and lateral directions.

The reflector unit 16 includes a light source bulb (e.g., a metal halide discharge bulb) 18, a bulb holder 40 (which will be described hereinafter) for fixedly supporting the light source bulb 18, a reflector 20 for tiltably supporting the bulb holder 40 around a fulcrum A, and a shade 22 fixedly supported by the bulb holder 40 so as to surround the light source bulb 18 within a predetermined range.

The lens 12 is a see-through lens and together with the reflector unit 16, controls light distribution. More specifically, the reflector 20 is fitted with a reflective surface 20a for forwardly reflecting light from a discharge light-emitting portion 18a of the light source bulb 18, and the diffusing, deflecting, and reflecting functions of the reflective surface 20a are utilized for the emission of beams having a light distribution pattern as will be described hereinafter.

The reflector 20 is supported with the lamp body 14 via aiming screws 24 at brackets 20b, each formed in both lateral upper end portions of the reflector 20 and also supported with the lamp body 14 via an actuator 28 of a leveling unit 26 at a bracket 20c formed in the lower right end portion (or the upper left end portion) of the headlamp 10.

Figure 2:
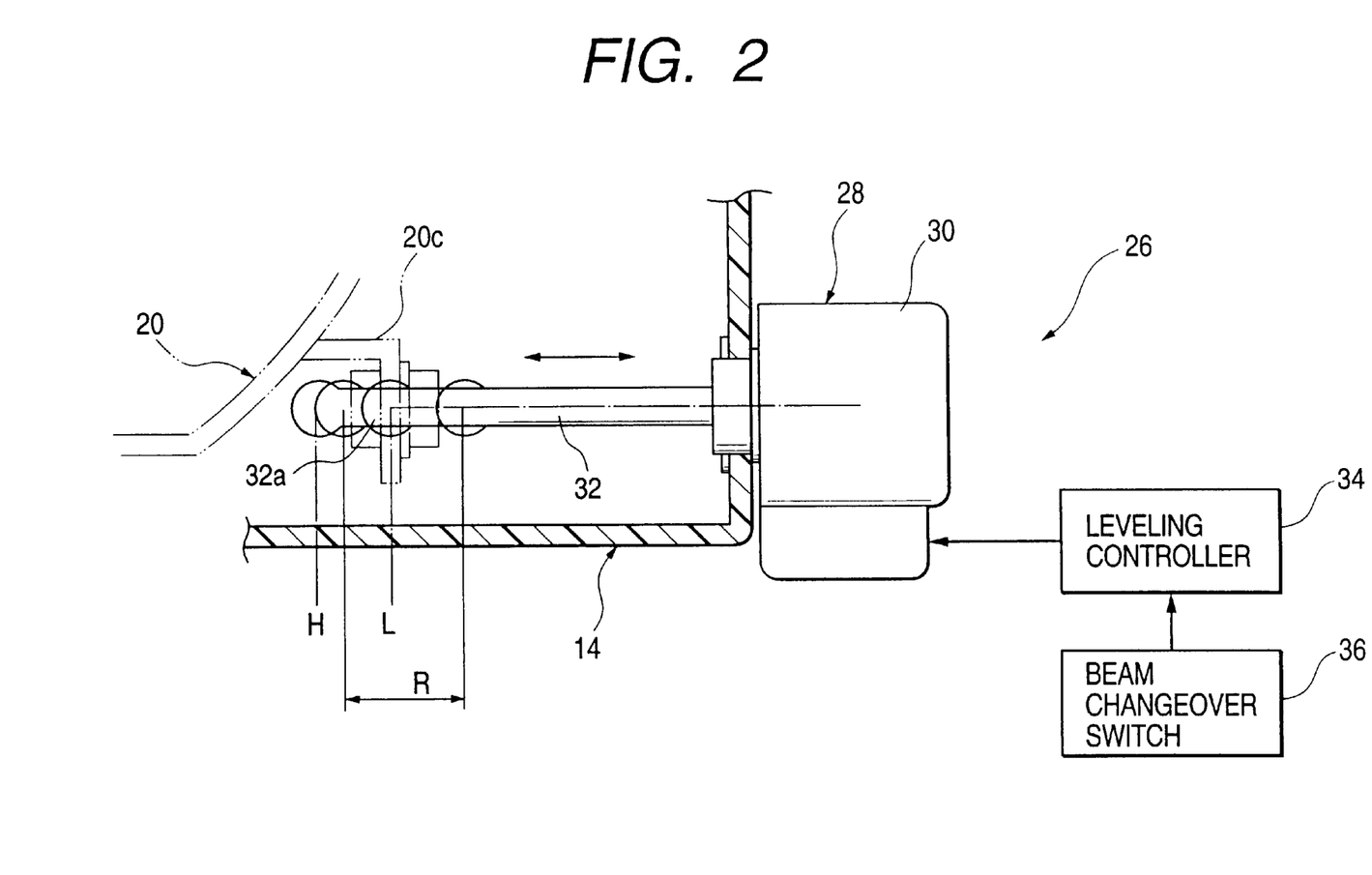
FIG. 2 is detailed side view of an actuator of a leveling unit in the first embodiment of the invention.

As shown in FIG. 2 in detail, the actuator 28 includes an actuator body 30 fixedly supported by the lamp body 14, and an output rod 32 projecting forward from the actuator body 30. A spherical leading end portion 32a of the output rod 32 is coupled to the bracket 20c of the reflector 20.

A leveling controller 34 of the leveling unit 26 causes the actuator 28 to be driven as the posture of a vehicle body varies, and by displacing the output rod 32 longitudinally, the leveling controller 34 makes the reflector unit 16 tilt vertically with the point A as a fulcrum and with a point B as a point of application in FIG. 1, to maintain the optimal direction of the emitted beam at all times as the posture of the vehicle body varies. In this case, this leveling control is not performed during the high-beam driving but performed during the low-beam driving.

Figure 5A:
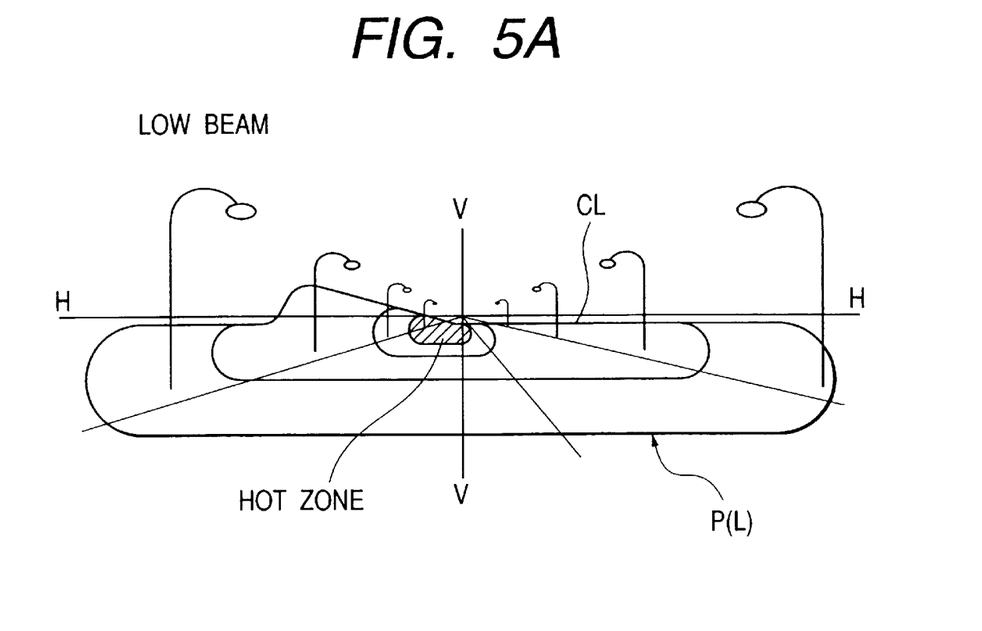
FIGS. 5a–5b are diagrams of a light distribution pattern illustrating the function of the first embodiment of the invention.

The adjustment of the optical axis Ax of the reflector unit 16 is made by adjusting the aiming screw 24 so that the output rod 32 of the actuator 28 is set at a reference leveling position L. The axis adjustment is intended to direct the optical axis Ax of the reflector 20 downward by 0.57° relative to the horizontal direction and when the optical axis adjustment is completed, there can be provided a low-beam light distribution pattern P (L) having a clear cutoff line (a light-to-shade boundary line) CL with its horizontal line portion positioned at 0.57° as shown in FIG. 5(a). The tilted angle position of the reflector 20 is hereinafter called a "reference leveling angle position."

A multiple closed curve shown by a solid line in the light distribution pattern P(L) indicates zone divisions that are irradiated in such a manner that the inner ones are made gradually brighter; that is, the central zone shown by slanting lines is the brightest hot zone.

As shown in FIG. 2, a leveling adjustment range R is set so that when the output rod 32 is displaced up to the front end position of the leveling adjustment range R, the reflector 20 is directed upward by 2° relative to the reference leveling angle position in one stroke, whereas when the output rod 32 is displaced up to the rear end position of the leveling adjustment range R, the reflector 20 is directed downward by 3° relative to the reference leveling angle position therein.

The leveling unit 26 also functions as a beam switching device, for performing not only the leveling control as mentioned above, but also switching of the beam between low and high beams. Consequently, a beam switching signal is inputted to the leveling controller 34 from a beam changeover switch 36.

As mentioned above, the leveling control is carried out by displacing the output rod 32 of the leveling unit 26 within the leveling adjustment range R. When a high-beam switching signal is inputted to the leveling controller 34 from the beam changeover switch 36, the output rod 32 is displaced up to a high-beam switching position H, ahead of the front end position of the leveling adjustment range R, to have the reflector unit 16 tilted up to an angle position of 3° upward relative to the reference leveling angle position, whereby the low beam is switched to the high beam.

As shown in FIG. 1, the bulb holder 40 is formed with a tilting bracket 40a in its upper end portion and an L-shaped bracket 40b in the lower end portion. The upper end portion of the tilting bracket 40a is coupled to a holder supporting bracket 20e formed in the upper part of the optical axis Ax in the back of the reflector 20 with a pin, so that the bulb holder 40 is tiltably supported around the fulcrum A with respect to the reflector 20.

On the other hand, the lower end portion of the L-shaped bracket 40b is linked with a tab 20f formed in the lower back end portion of the reflector 20 via a tension spring 42 so as to bring the bulb holder 40 into contact with the rear opening 20d of the reflector 20 by resiliently urging the bulb holder 40 forward. A stopper-pin inserting hole 40c is formed in the intermediate portion of the L-shaped bracket 40b, so that a stopper pin 44 extending longitudinally is inserted therein.

The stopper pin 44 is screwed into a boss portion 14b formed in the rear wall portion 14a of the lamp body 14, and a driver mating groove 44a is formed in the rear end portion of the stopper pin 44. Further, the stopper pin 44 is made displaceable longitudinally by operating a driver. The front end portion of the stopper pin 44 is formed into a spherical portion 44b and when the L-shaped bracket 40b undergoes a predetermined amount of forward displacement with respect to the stopper pin 44, the spherical portion 44b is brought into contact with the L-shaped bracket 40b, so that the L-shaped bracket 40b is stopped from being displaced forward further. In this case, the front-end peripheral edge portion of the inserting hole 40c in the front of the L-shaped bracket 40b is made spherical so that the L-shaped bracket 40b is smoothly brought into contact with the spherical portion 44b.

The position where the stopper pin 44 is screwed into the lamp body 14 is set as follows. When the optical axis of the reflector unit 16 is adjusted, the stopper pin 44 is displaced sufficiently forward beforehand so that it may not hamper the optical axis adjustment. The output rod 32 of the actuator 28 is displaced up to the front end position of the leveling adjustment range R after the optical axis adjustment is completed and the stopper pin 44 is displaced backward in this state. Then the stopper pin 44 is stopped in the position where the spherical portion 44b of the stopper pin 44 has been brought into contact with the L-shaped bracket 40b lightly.

Figure 3:
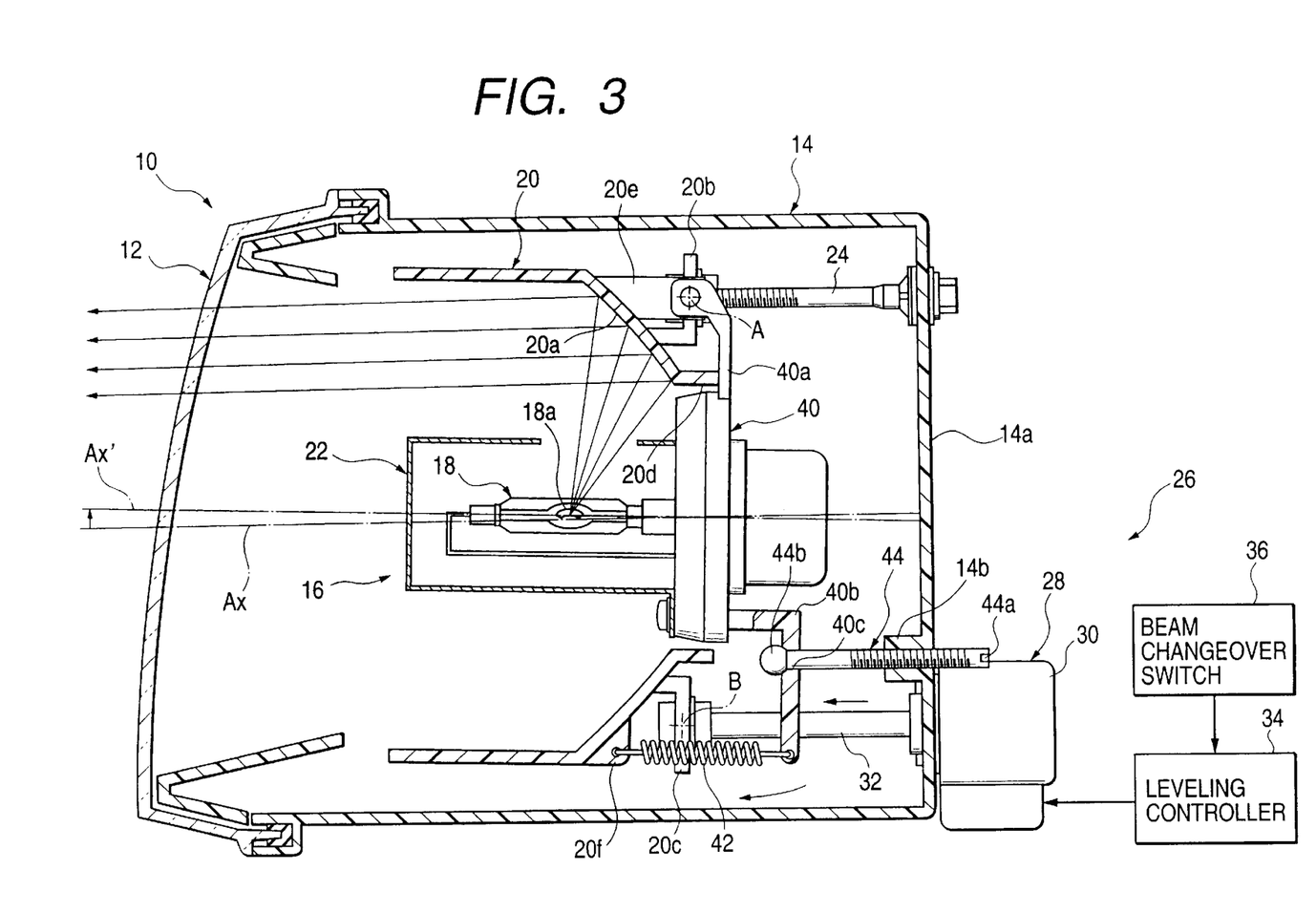
FIG. 3 is a sectional side view illustrating the function of the first embodiment of the invention.

In such a state that the stopper pin 44 has thus been positioned, the bulb holder 40 and the reflector 20 are tilted together within the leveling adjustment range R. FIG. 3 shows a situation in which the output rod 32 has been displaced up to the front end position of the leveling adjustment range R and the reflector 20 has been directed upward by 2° relative to the reference leveling angle position as indicated by Ax'.

Figure 4:
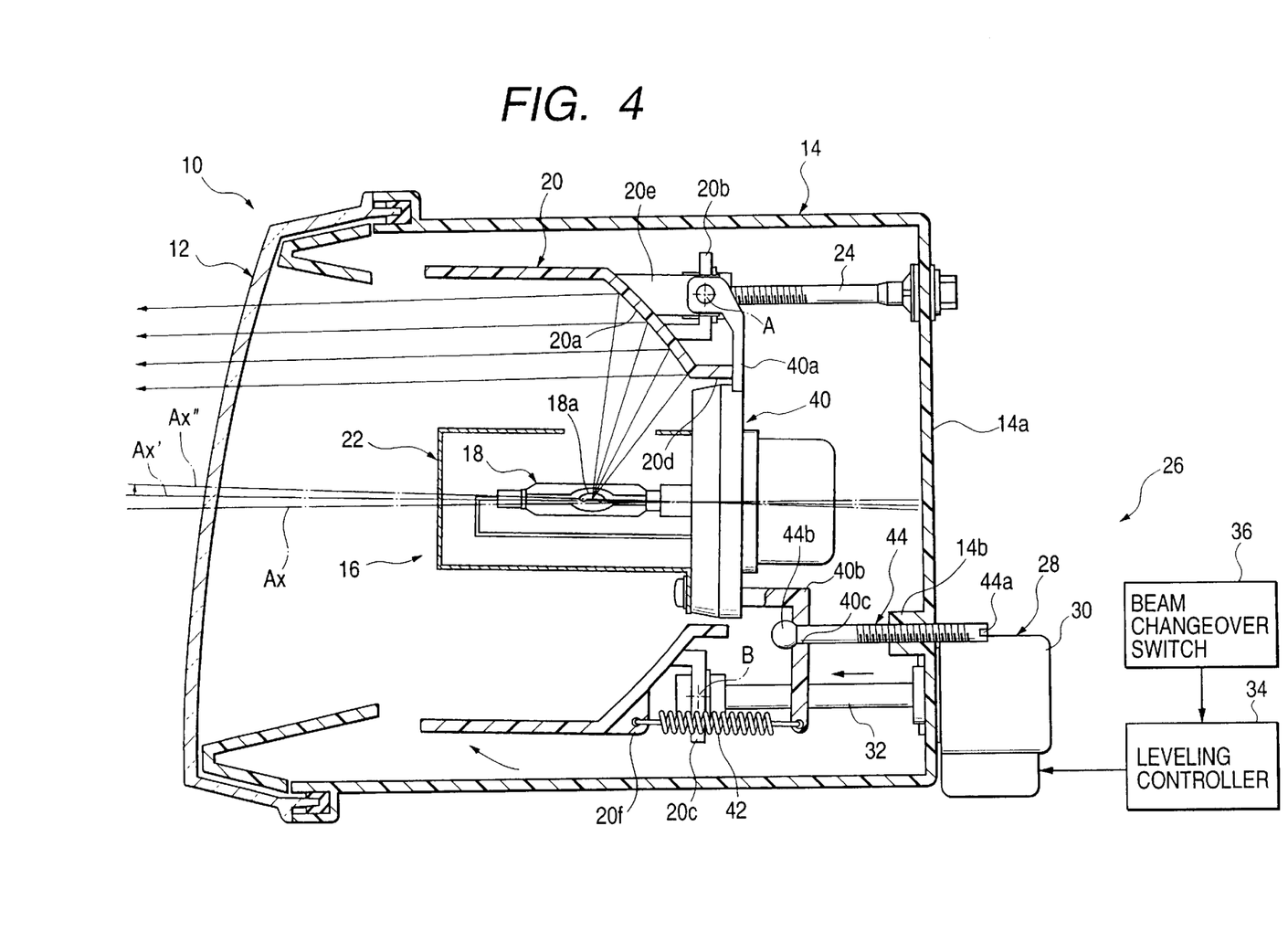
FIG. 4 is another sectional side view illustrating the function of the first embodiment of the invention.

When the low beam is switched to the high beam, however, the output rod 32 is displaced up to the high-beam switching position H ahead of the front end position of the leveling adjustment range R. As shown in FIG. 4, the bulb holder 40 is brought into contact with the stopper pin 44 and fixedly directed upward by 2° relative to the reference leveling angle position, whereas only the reflector 20 continues to be tilted up to the tilt angle position where it is directed upward by 3° relative to the reference leveling angle position as indicated by Ax". At this time, the light source bulb 18 together with the bulb holder 40 is relatively tilted downward by 1° around the fulcrum A relative to the reflector 20, whereby the discharge light-emitting portion 18a of the light source bulb 18 is displaced downwardly relative to the optical axis Ax of the reflector 20 (see FIG. 3).

Figure 5B:
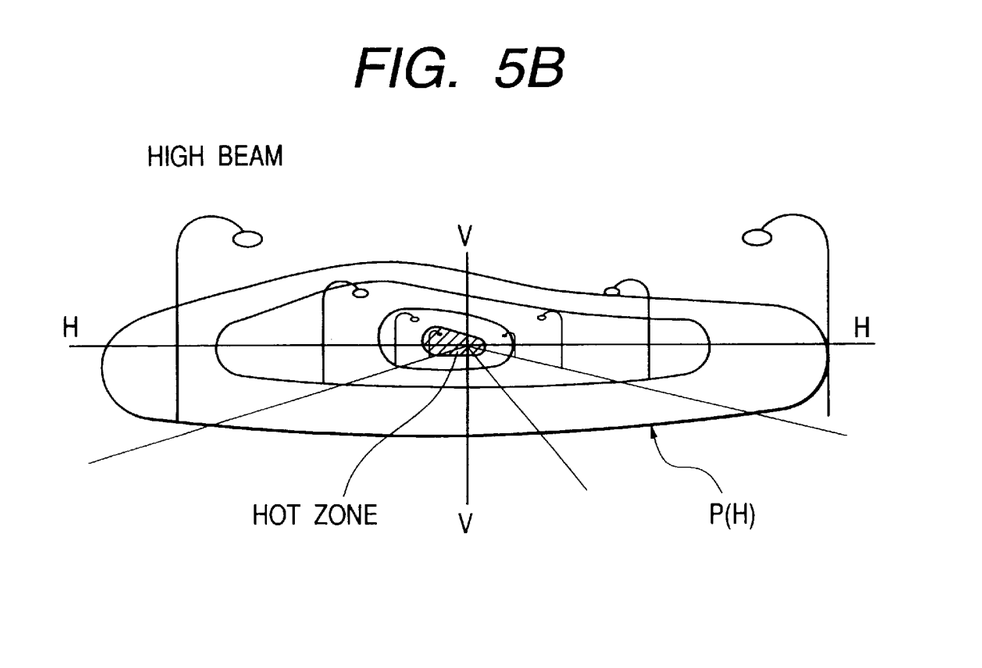

FIG. 5(b) shows a light distribution pattern for the high beam P(H) when the reflector 20 is directed upward up to the tilt angle position for the high beam.

Unlike the light distribution pattern for the low beam P(L) which has been directed upward by 3° as shown in FIG. 5(a), the light distribution pattern P(H) is a light distribution pattern capable of making remote visibility satisfactorily secured during the high-beam driving, because light convergence toward H-V (in the direction of the right front of the lamp) becomes increased and because the cutoff line CL is practically eliminated by displacing the discharge light-emitting portion 18a of the light source bulb 18 downwardly relative to the optical axis Ax (see FIG. 4).

As set forth above in detail, the high-beam light distribution pattern is not established only by directing the low-beam light distribution pattern upward, since the reflector 20 is tilted separately from the bulb holder 40 after the reflector 20 is tilted past a certain point, according to this embodiment of the invention. By achieving a light distribution pattern excellent in remote visibility with a larger portion of upward emission light, the leveling actuator 28 can be used simultaneously as a beam switching actuator. Therefore, according to this embodiment of the invention, the leveling as well as beam switching can be carried out with a simple, lightweight and inexpensive construction.

A second embodiment of the invention will now be described.

Figure 6:
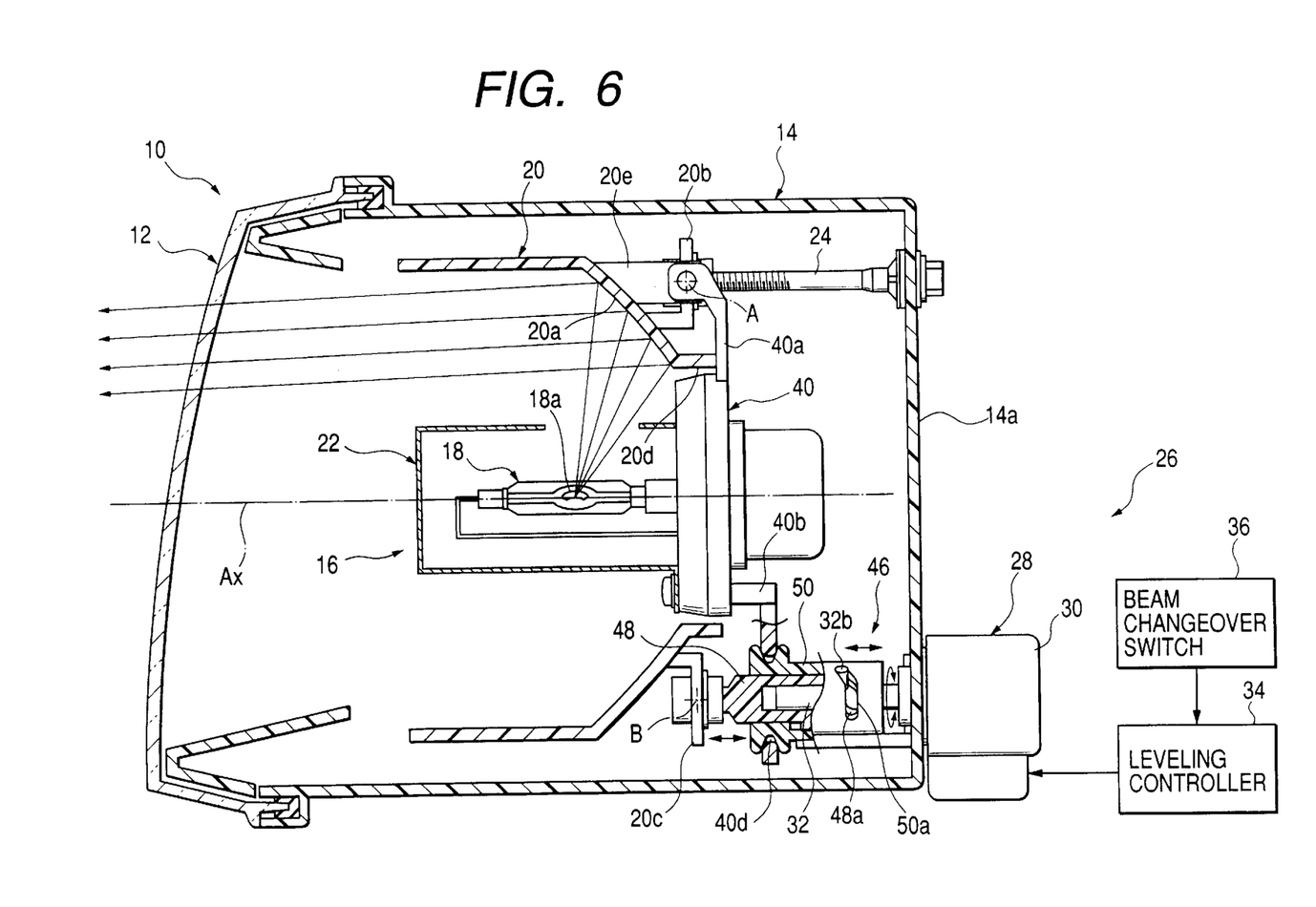
FIG. 6 is a sectional side view of a second embodiment of a vehicle headlamp of the present invention.

FIG. 6 is a sectional side view of a vehicle headlamp embodying the present invention. As shown in FIG. 6, a vehicle headlamp according to this embodiment of the invention is substantially similar to that in the first embodiment thereof, except the basic construction of the lamp is concerned with a bulb-holder separating mechanism 46 for separating the bulb holder 40 from the reflector 20 when the reflector 20 is tilted upward, and when the low beam is switched to the high beam, it is localized close to the output rod 32 of the leveling actuator 28.

The actuator 28 according to this embodiment of the invention is a rotary drive type actuator that causes the output rod 32 to be pivoted in a predetermined angle range.

The bulb-holder separating mechanism 46 comprises an inner cylindrical cam 48 and an outer cylindrical cam 50 which are fitted to the output rod 32 of the actuator 28. The inner cylindrical cam 48 is coupled to the bracket 20c of the reflector 20, whereas the outer cylindrical cam 50 is coupled to the L-shaped bracket 40b of the bulb holder 40. Cam grooves 48*a* and 50*a* mating with pins 32*b* provided on the output rod 32 fit in these inner and outer cylindrical cams 48 and 50, respectively. These inner and outer cylindrical cams 48 and 50 are driven by the actuator 28 integrally and longitudinally within the leveling adjustment range when the output rod 32 is pivotally driven. When the reflector 20 is tilted upward beyond the leveling adjustment range, only the inner cylindrical cam 48 is moved longitudinally while the outer cylindrical cam 50 stands still, so that only the reflector 20 is tilted upward.

Figure 7:
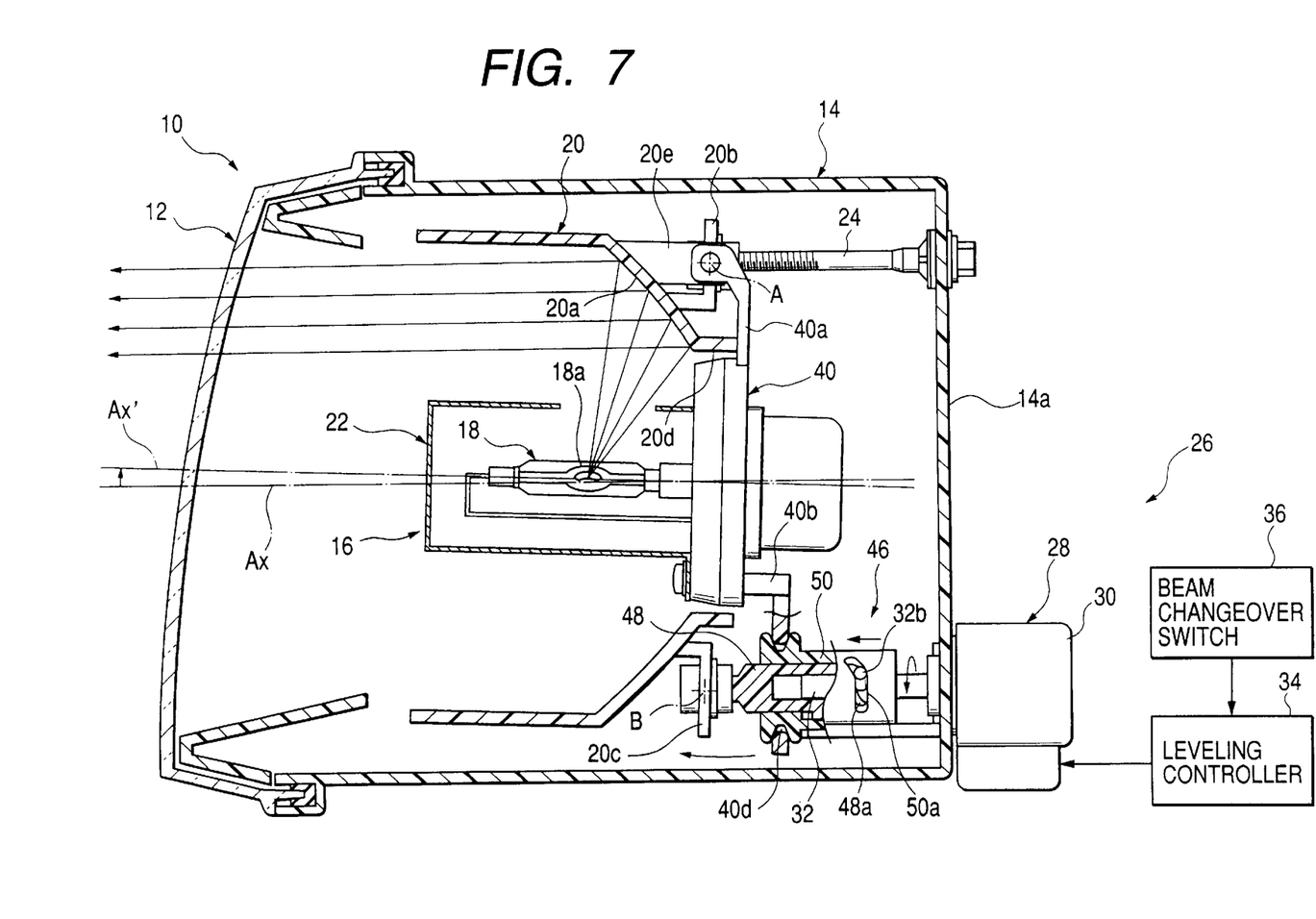
FIG. 7 is sectional side view illustrating the function of the second embodiment of the invention.
Figure 8:
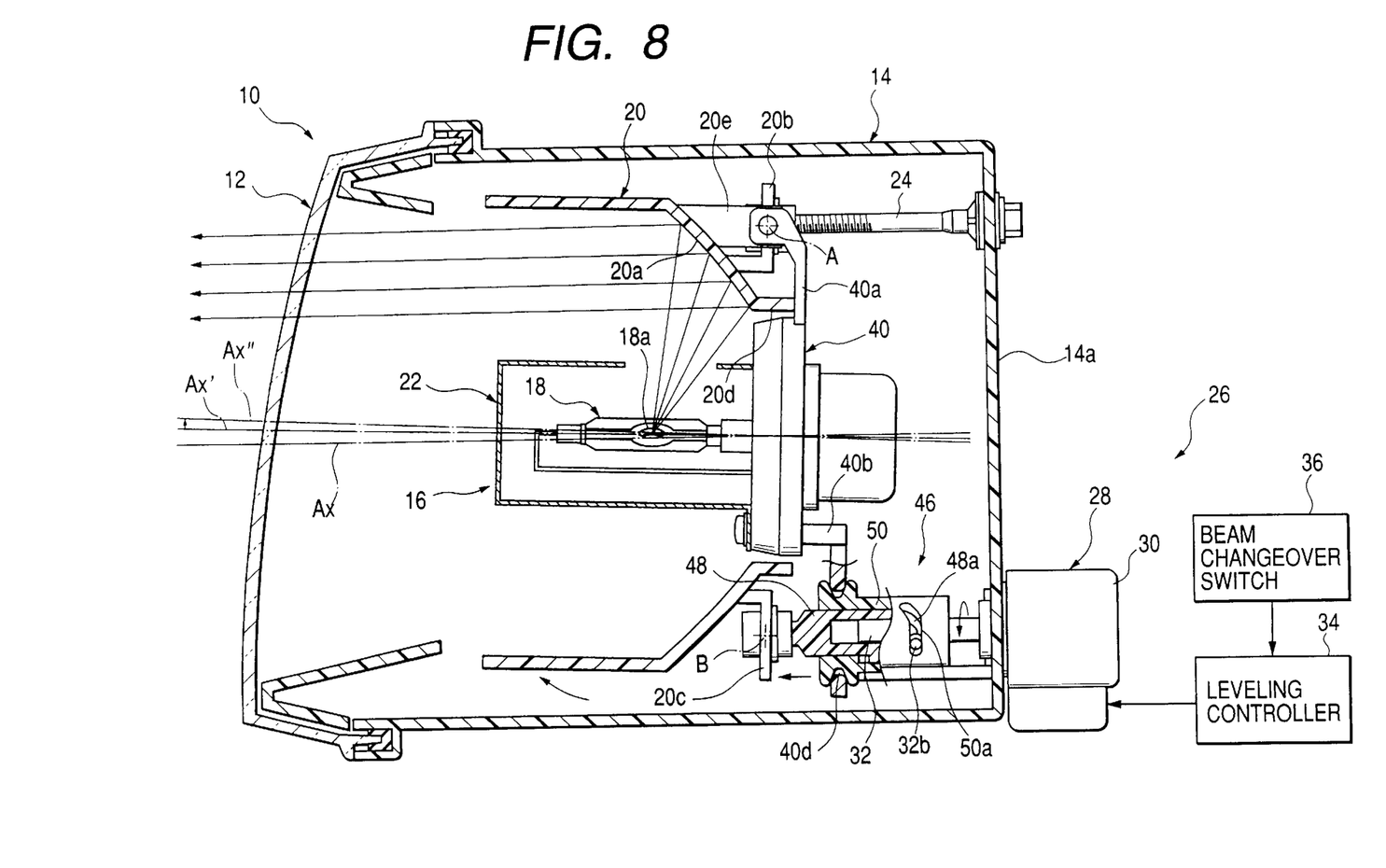
FIG. 8 is another sectional side view illustrating the function of the second embodiment of the invention.

FIG. 7 is a sectional side view showing a state in which the output rod 32 is pivotally displaced up to one pivotal end of the leveling adjustment range, which results in directing the reflector 20 upward by 2° relative to the reference leveling angle position. FIG. 8 is a sectional side view showing a state in which the output rod 32 is pivotally displaced up to the high-beam switching position beyond the aforementioned pivotal end of the leveling adjustment range, which results in directing the reflector 20 upward by 3° relative to the reference leveling angle position.

Figure 9:
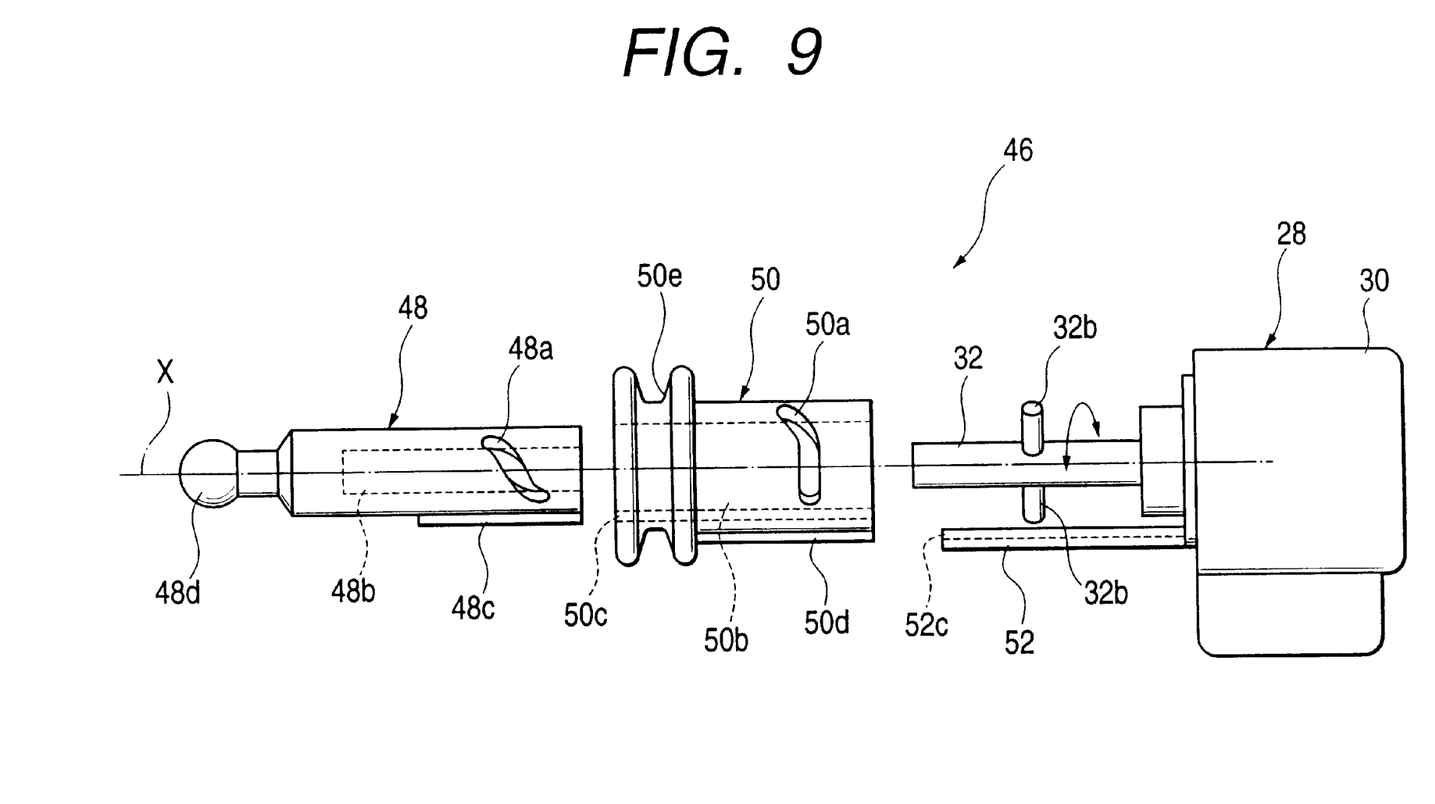
FIG. 9 is an exploded side view of a bulb-holder separating mechanism together with an actuator according to the second embodiment of the invention.

FIG. 9 is an exploded side view of the inner and outer cylindrical cams 48 and 50 constituting the bulb-holder separating mechanism 46, and the actuator 28.

As shown in FIG. 9, a pair of opposed pins 32*b* are provided for the output rod 32 of the actuator 28 and correspondingly a pair of cam grooves 48*a* and 50*a* are each formed in the inner and outer cylindrical cams 48 and 50. The cam groove 48*a* of the inner cylindrical cam 48 is spirally formed relative to a rotational axis X of the output rod 32, whereas the cam groove 50*a* of the outer cylindrical cam 50 is formed at the same lead angle as that of the cam groove 48*a* of the inner cylindrical cam 48 and in phase therewith up to a halfway point. However, the cam groove 50*a* of the outer cylindrical cam 50 is so formed as to extend circumferentially relative to the rotational axis X from the halfway point.

An inserting hole 48*b* for receiving the output rod 32 is formed in the inner cylindrical cam 48, and a rib 48*c* for stopping the inner cylindrical cam 48 from rotating is formed in its outer peripheral lower end portion. Moreover, a spherical pivot 48*d* for being coupled to the bracket 20*c* of the reflector 20 is formed in the front end portion of the inner cylindrical cam 48.

An inserting hole 50*b* for receiving the inner cylindrical cam 48 is formed in the outer cylindrical cam 50, and a mating groove 50*c* for being mated with the rib 48*c* of the inner cylindrical cam 48 is formed in the inner peripheral lower end portion of the inserting hole 48*b*. Further, a rib 50*d* for stopping the outer cylindrical cam 50 is formed in the outer peripheral lower end portion of the outer cylindrical cam 50, and a double annular rib 50*e* for being mated with the L-shaped bracket 40*b* of the bulb holder 40 is formed in the outer peripheral front end portion. As further shown in FIG. 6, a mating hole 40*d* for being mated with the double annular rib 50*e* is formed in the L-shaped bracket 40*b* of the bulb holder 40.

A beam 52 with a mating groove 52*c* for being mated with the rib 50*d* of the outer cylindrical cam 50 is provided in the front edge face of the actuator body 30 of the actuator 28.

When the actuator 28 is driven with the inner and outer cylindrical cams 48 and 50 fitted to the output rod 32, the output rod 32 is rotated but the inner and outer cylindrical cams 48 and 50 are not rotated. Consequently, the pins 32*b* of the output rod 32 are moved along the cam grooves 48*a* and 50*a*, whereby the inner and outer cylindrical cams 48 and 50 are moved longitudinally. However, the outer cylindrical cam 50 is kept standing still as it does not receive a longitudinal pressing force from the pins 32*b* when the pins 32 are positioned in the circumferentially-extended portion of the cam groove 50*a*.

When the output rod 32 is rotated counterclockwise while the pins 32*b* are positioned in the front end portions of the cam grooves 48*a* and 50*a*, the inner and outer cylindrical cams 48 and 50 are moved forward together relative to the output rod 32 up to a halfway point and then only the inner cylindrical cam 48 is moved forward from the halfway point. An area where the inner and outer cylindrical cams 48 and 50 are moved forward integrally is an area for use in making the leveling adjustment, and an area where only the inner cylindrical cam 48 is moved forward is an area for use in switching the low beam to the high beam.

As set forth above in detail, the high-beam light distribution pattern is not established only by directing the low-beam light distribution pattern upward since the reflector 20 is tilted separately from the bulb holder 40 midway when the reflector 20 is tilted upward according to even this embodiment of the invention. To achieve a light distribution pattern excellent in remote visibility with a larger portion of upward emission light, the leveling actuator 28 can be used simultaneously as a beam switching actuator. Therefore, according to this embodiment of the invention, the leveling as well as beam switching can be carried out with a simple, lightweight, inexpensive construction.

In this embodiment of the invention, moreover, the intended function and effect of the invention can be achieved with compact construction since the bulb-holder separating mechanism 46 has been localized close to the output rod 32 of the leveling actuator 28.

Although the fulcrum A between the bulb holder 40 and the reflector 20 is positioned above the optical axis Ax according to the aforementioned embodiments of the invention, it may be positioned under the optical axis Ax. Even with the arrangement above, the function and effect of the invention can be obtained similarly as in the aforementioned embodiments of the invention.

Although the bulb holder 40 and the reflector 20 have been described as those which are tilted around the fulcrum A set in the same position according to this embodiment of the invention, the tilting fulcrum of the bulb holder 40 may be set in a different position from that of the reflector 20. In this case, the light distribution pattern may be made different from the high-beam light distribution pattern of FIG. 5(*b*) by properly selecting the position of the tilting fulcrum of the bulb holder 40.

It will be apparent to those skilled in the art that various modifications and variations can be made in the manifold unit according to the present invention without departing from the spirit or scope of the invention. Thus, it is intended that the present invention cover the modifications and variations of the invention provided they come within the scope of the appended claims and their equivalents.

What is claimed is:

1. A vehicle headlamp comprising:
    a lamp body;
    a light source bulb;
    a reflector for emitting a beam with a predetermined light distribution pattern by reflecting light from said light source bulb forward;
    a bulb holder which is vertically tiltably supported by said reflector and fixedly supports said light source bulb;
    a leveling unit for varying the direction of emitting the beam in accordance with a change in the posture of a vehicle body by vertically tilting said reflector; and a beam switching device for selectively switching the beam from a low beam to a high beam and vice versa, said beam switching device tilting an optical axis of said reflector to a first predetermined angle by driving said leveling unit in order to switch the low beam to the high beam, and said beam switching device tilting said bulb holder together with said reflector until an optical axis of said reflector is tilted to a second predetermined angle, said second predetermined angle being smaller than said first predetermined angle, and maintains said bulb holder at a first tilting angle while the optical axis of said reflector is tilted at a second tilting angle in a range between said second predetermined angle and said first predetermined angle, said first tilting angle is smaller than said second tilting angle.

2. The vehicle headlamp as claimed in claim 1, wherein said beam switching device stops said bulb holder at said second predetermined angle while said optical axis of said reflector is tilted more than said second predetermined angle.

3. The vehicle headlamp as claimed in claim 1, wherein said beam switching device restricts further tilting of said bulb holder while the optical axis of said reflector is tilted at a second tilting angle in a range of said second predetermined angle and said first predetermined angle, and said first tilting angle is substantially equal to said second predetermined angle.

4. The vehicle headlight according to claim 1, wherein said reflector has a reference angular position in which the low beam has a predetermined luminous intensity distribution therefor, said reference angular position determines a reference optical axis of said reflector, and said reference optical axis directs down below the horizontal line.

5. The vehicle headlight according to claim 4, wherein said second predetermined angle is 2° upward from said reference optical axis, and said first predetermined angle is 3° upward said reference optical axis.

6. The vehicle head lamp as claimed in claim 3, wherein said reflector has a reference angular position in which the low beam has a predetermined luminous intensity distribution therefor, said reference angular position determines a reference optical axis of said reflector, and said reference optical axis directs down below the horizontal line.

7. The vehicle head lamp as claimed in claim 6, wherein said second predetermined angle is 2° upward from said reference optical axis, and said first predetermined angle is 3° upward said reference optical axis.

8. The vehicle head lamp as claimed in claim 2, wherein a bulb-holder separating mechanism stops said bulb holder at said second predetermined angle, said bulb-holder separating mechanism including a cam mechanism for cooperating with said leveling unit.

9. The vehicle head lamp as claimed in claim 1, wherein said reflector has a reference angular position in which the low beam has a predetermined luminous intensity distribution therefor, said reference angular position determines a reference optical axis of said reflector, and said reference optical axis directs down below the horizontal line, and wherein said second predetermined angle is adjustable to deviate from said reference optical axis.

10. The vehicle head lamp as claimed in claim 9, further comprising a bulb switching device which adjusts said second predetermined angle, said bulb switching device preventing said bulb holder from further tilting while said optical axis of said reflector is tilted to exceed said second predetermined angle.

11. The vehicle head lamp as claimed in claim 10, wherein said bulb switching device includes a stopper pin supported on said lamp body.

12. The vehicle head lamp as claimed in claim 11, wherein said stopper pin includes a screwed portion engaging with said lamp body.

13. The vehicle head lamp as claimed in claim 11, wherein said bulb holder comprises a L-shaped bracket, and said stopper pin includes a spherical portion at a tip thereof, said stopper pin being inserted to said L-shaped bracket.

14. The vehicle head lamp as claimed in claim 1, further comprising a tension spring which connects said bulb holder to said reflector.

15. The vehicle head lamp as claimed in claim 14, further comprising a bulb switching device which adjusts said second predetermined angle, wherein said bulb holder tilts together with said reflector by said tension spring until said optical angle of said reflector coincides with said second predetermined angle, and wherein said bulb switching device prevents said bulb holder from further tilting while said optical axis of said reflector is tilted to exceed said second predetermined angle.

16. The vehicle head lamp as claimed in claim 1, wherein said bulb holder and said reflector are tilted around a fulcrum which is positioned above an optical axis of said reflector.

17. The vehicle head lamp as claimed in claim 1, wherein said bulb holder and said reflector are tilted around a fulcrum which is positioned below an optical axis of said reflector.

18. The vehicle head lamp as claimed in claim 1, wherein said bulb holder are tilted around a first fulcrum and said reflector are tilted around a second fulcrum.

19. The vehicle head lamp as claimed in claim 18, wherein said first fulcrum and said second fulcrum are positioned at the same point.

* * * * *